United States Patent
Moser et al.

(10) Patent No.: US 8,184,285 B2
(45) Date of Patent: May 22, 2012

(54) METHOD AND APPARATUS USING VOLUME HOLOGRAPHIC WAVELENGTH BLOCKERS

(75) Inventors: Christophe Moser, Pasadena, CA (US); Frank Havermeyer, Arcadia, CA (US)

(73) Assignee: Ondax, Inc., Monrovia, CA (US)

( * ) Notice: Subject to any disclaimer, the term of this patent is extended or adjusted under 35 U.S.C. 154(b) by 0 days.

(21) Appl. No.: 13/157,265

(22) Filed: Jun. 9, 2011

(65) Prior Publication Data

US 2012/0002197 A1    Jan. 5, 2012

Related U.S. Application Data (63) Continuation of application No. 12/315,470, filed on Dec. 3, 2008, now Pat. No. 7,986,407.

(60) Provisional application No. 61/137,871, filed on Aug. 4, 2008.

(51) Int. Cl.
G01J 3/44    (2006.01)
(52) U.S. Cl. .......................... 356/301; 359/15
(58) Field of Classification Search .................. 356/301; 359/15

See application file for complete search history.

(56) References Cited

U.S. PATENT DOCUMENTS

| | | |
|---|---|---|
| 3,588,254 A | 6/1971 | Rhoades |
| 3,588,738 A | 6/1971 | Goodwin |
| 3,659,947 A | 5/1972 | Neumann |
| 3,902,135 A | 8/1975 | Terada |
| 4,017,144 A | 4/1977 | Staebler |
| 4,057,408 A | 11/1977 | Pierson |
| 4,103,254 A | 7/1978 | Chikami |
| 4,181,515 A | 1/1980 | Dyott |
| 4,456,328 A | 6/1984 | Arns |
| 4,794,344 A | 12/1988 | Johnson |
| 4,807,950 A | 2/1989 | Glenn |
| 4,824,193 A | 4/1989 | Maeda |
| 4,942,583 A | 7/1990 | Nazarathy |
| 5,042,898 A | 8/1991 | Morey |
| 5,107,365 A | 4/1992 | Ota |
| 5,221,957 A | 6/1993 | Jannson |
| 5,315,417 A | 5/1994 | Moss et al. |
| 5,335,098 A | 8/1994 | Leyva |
| 5,388,173 A | 2/1995 | Glenn |
| 5,432,623 A | 7/1995 | Egan |
| 5,440,669 A | 8/1995 | Rakuljic |

(Continued)

FOREIGN PATENT DOCUMENTS

DE    4214014    11/1992

OTHER PUBLICATIONS

Askins, "Fiber Bragg refractors prepared by a single excimer pulse," Opt. Lett., vol. 17(11), pp. 833-835 (1992).

(Continued)

*Primary Examiner* — Layla Lauchman
(74) *Attorney, Agent, or Firm* — Carr & Ferrell LLP (57) ABSTRACT

The invention disclosed here teaches methods to fabricate and utilize a non-dispersive holographic wavelength blocker. The invention enables the observation of the Raman signal near the excitation wavelength ($\sim 9$ cm$^{-1}$) with the compactness of standard thin film/holographic notch filter. The novelty is contacting several individual volume holographic blocking notch filter (VHBF) to form one high optical density blocking filter without creating spurious multiple diffractions that degrade the filter performance. Such ultra-narrow-band VHBF can be used in existing compact Raman instruments and thus will help bring high-end research to a greater number of users at a lower cost.

31 Claims, 9 Drawing Sheets

U.S. PATENT DOCUMENTS

| | | | |
|---|---|---|---|
| 5,491,570 A | 2/1996 | Rakuljic |
| 5,517,525 A | 5/1996 | Endo |
| 5,594,744 A | 1/1997 | Lefevre |
| 5,625,453 A | 4/1997 | Matsumoto |
| 5,636,304 A | 6/1997 | Mizrahi |
| 5,640,256 A | 6/1997 | De Vre |
| 5,657,121 A | 8/1997 | Nishina |
| 5,684,611 A | 11/1997 | Rakuljic |
| 5,691,989 A | 11/1997 | Rakuljic |
| 5,771,250 A | 6/1998 | Shigehara |
| 5,796,096 A | 8/1998 | Rakuljic |
| 5,844,700 A | 12/1998 | Jeganathan |
| 5,917,648 A | 6/1999 | Harker |
| 5,943,128 A | 8/1999 | Slater |
| 5,960,133 A | 9/1999 | Tomlinson |
| 5,966,391 A | 10/1999 | Zediker |
| 6,049,554 A | 4/2000 | Lang |
| 6,100,975 A | 8/2000 | Smith |
| 6,101,301 A | 8/2000 | Engelberth |
| 6,139,146 A | 10/2000 | Zhang |
| 6,147,341 A | 11/2000 | Lemaire |
| 6,169,829 B1 | 1/2001 | Laming |
| 6,192,062 B1 | 2/2001 | Sanchez-Rubio |
| 6,211,976 B1 | 4/2001 | Popovich |
| 6,221,535 B1 | 4/2001 | Cox |
| 6,226,084 B1 | 5/2001 | Tormod |
| 6,249,624 B1 | 6/2001 | Putnam |
| 6,281,974 B1 | 8/2001 | Scheiner et al. |
| 6,304,687 B1 | 10/2001 | Inoue |
| 6,327,283 B1 | 12/2001 | Hung |
| 6,327,292 B1 | 12/2001 | Sanchez-Rubio |
| 6,339,609 B2 | 1/2002 | Lefevre |
| 6,356,684 B1 | 3/2002 | Patterson |
| 6,363,187 B1 | 3/2002 | Fells |
| 6,370,310 B1 | 4/2002 | Jin |
| 6,396,982 B1 | 5/2002 | Lin |
| 6,414,973 B1 | 7/2002 | Hwu |
| 6,449,097 B1 | 9/2002 | Zhu |
| 6,498,872 B2 | 12/2002 | Bouevitch |
| 6,498,891 B1 | 12/2002 | Montesanto |
| 6,507,693 B2 | 1/2003 | Maron |
| 6,512,618 B1 | 1/2003 | Heflinger |
| 6,568,220 B1 | 5/2003 | Paek |
| 6,586,141 B1 | 7/2003 | Efimov |
| 6,587,180 B2 | 7/2003 | Wang |
| 6,606,152 B2 | 8/2003 | Littau |
| 6,621,957 B1 | 9/2003 | Sullivan |
| 6,628,862 B1 | 9/2003 | Yao |
| 6,670,079 B1 | 12/2003 | Kitamura |
| 6,673,497 B2 | 1/2004 | Efimov |
| 6,714,309 B2 | 3/2004 | May |
| 6,750,996 B2 | 6/2004 | Jagt |
| 6,768,577 B2 | 7/2004 | Namiki |
| 6,788,849 B1 | 9/2004 | Pawluczyk |
| 6,822,218 B2 | 11/2004 | Helmig et al. |
| 6,828,262 B2 | 12/2004 | Borrelli |
| 6,829,067 B2 | 12/2004 | Psaltis |
| 6,844,946 B2 | 1/2005 | Buse |
| 6,847,763 B2 | 1/2005 | Eggleton |
| 6,879,441 B1 | 4/2005 | Mossberg |
| 6,904,200 B2 | 6/2005 | Wang |
| 6,934,060 B2 | 8/2005 | Psaltis |
| 6,987,907 B2 | 1/2006 | Psaltis |
| 6,992,805 B2 | 1/2006 | Ingwall |
| 7,002,697 B2 | 2/2006 | Domash |
| 7,031,573 B2 | 4/2006 | Volodin |
| 7,081,977 B2 | 7/2006 | Kim |
| 7,081,978 B2 | 7/2006 | Chen |
| 7,125,632 B2 | 10/2006 | Volodin |
| 7,136,206 B2 | 11/2006 | Psaltis |
| 7,173,950 B2 | 2/2007 | Hand |
| 7,212,554 B2 | 5/2007 | Zucker |
| 7,245,369 B2 | 7/2007 | Wang |
| 7,245,407 B2 | 7/2007 | Komma |
| 7,248,617 B2 | 7/2007 | Volodin |
| 7,248,618 B2 | 7/2007 | Volodin |
| 7,273,683 B2 | 9/2007 | Volodin |
| 7,298,771 B2 | 11/2007 | Volodin |
| 7,355,768 B1 | 4/2008 | Billmers |
| 7,359,046 B1 | 4/2008 | Steckman |
| 7,359,420 B2 | 4/2008 | Shchegrov |
| 7,372,565 B1 | 5/2008 | Holden et al. |
| 7,391,703 B2 | 6/2008 | Volodin |
| 7,397,837 B2 | 7/2008 | Volodin |
| 7,477,818 B2 | 1/2009 | Volodin |
| 7,483,190 B2 | 1/2009 | Psaltis |
| 7,528,385 B2 | 5/2009 | Volodin |
| 7,542,639 B2 | 6/2009 | Moser |
| 7,545,844 B2 | 6/2009 | Volodin |
| 7,548,313 B2 | 6/2009 | Nguyen |
| 7,570,320 B1 | 8/2009 | Anderson |
| 7,590,162 B2 | 9/2009 | Volodin |
| 7,605,911 B2 | 10/2009 | Wieloch |
| 7,633,985 B2 | 12/2009 | Volodin et al. |
| 7,636,376 B2 | 12/2009 | Moser et al. |
| 7,639,718 B1 | 12/2009 | Moser et al. |
| 7,667,882 B2 | 2/2010 | Adibi |
| 7,697,589 B2 | 4/2010 | Volodin et al. |
| 7,719,675 B2 | 5/2010 | Grygier |
| 7,746,480 B2 | 6/2010 | Ozcan |
| 7,792,003 B2 | 9/2010 | Volodin et al. |
| 7,796,673 B2 | 9/2010 | Volodin et al. |
| 7,817,888 B2 | 10/2010 | Volodin et al. |
| 7,830,507 B2 | 11/2010 | Brady et al. |
| 2001/0050751 A1 | 12/2001 | Banyai |
| 2002/0015376 A1 | 2/2002 | Liu |
| 2002/0045104 A1 | 4/2002 | Efimov |
| 2002/0093701 A1 | 7/2002 | Zhang |
| 2002/0141063 A1 | 10/2002 | Petrov |
| 2002/0154315 A1 | 10/2002 | Myrick |
| 2002/0181035 A1 | 12/2002 | Donoghue |
| 2003/0007202 A1 | 1/2003 | Moser |
| 2003/0011833 A1 | 1/2003 | Yankov |
| 2003/0072336 A1 | 4/2003 | Senapati |
| 2003/0128370 A1 | 7/2003 | De Lega |
| 2003/0156607 A1 | 8/2003 | Lipson |
| 2003/0169787 A1 | 9/2003 | Vurgaftman |
| 2003/0190121 A1 | 10/2003 | Luo |
| 2003/0210863 A1 | 11/2003 | Myers |
| 2003/0231305 A1 | 12/2003 | Zeng |
| 2004/0021920 A1 | 2/2004 | Psaltis |
| 2004/0165639 A1 | 8/2004 | Lang |
| 2004/0191637 A1 | 9/2004 | Steckman |
| 2004/0253751 A1 | 12/2004 | Salnik |
| 2004/0258356 A1 | 12/2004 | Brice |
| 2005/0018743 A1 | 1/2005 | Volodin |
| 2005/0129072 A1 | 6/2005 | Tayebati |
| 2005/0206984 A1 | 9/2005 | Kawano |
| 2005/0226636 A1 | 10/2005 | Hiramatsu |
| 2005/0248819 A1 | 11/2005 | Hymel |
| 2005/0248820 A1 | 11/2005 | Moser |
| 2005/0270607 A1 | 12/2005 | Moser |
| 2006/0029120 A1 | 2/2006 | Mooradian |
| 2006/0098258 A1 | 5/2006 | Chen |
| 2006/0114955 A1 | 6/2006 | Steckman |
| 2006/0156241 A1 | 7/2006 | Psaltis |
| 2006/0251143 A1 | 11/2006 | Volodin |
| 2006/0256830 A1 | 11/2006 | Volodin |
| 2006/0280209 A1 | 12/2006 | Treusch |
| 2007/0047608 A1 | 3/2007 | Volodin |
| 2007/0160325 A1 | 7/2007 | Son |
| 2010/0027001 A1 | 2/2010 | Moser |
| 2010/0103489 A1 | 4/2010 | Moser |
| 2010/0110429 A1 | 5/2010 | Simoni |
| 2010/0149647 A1 | 6/2010 | Figueroa |
| 2011/0216316 A1 | 9/2011 | Moser et al. |
| 2011/0216384 A1 | 9/2011 | Moser et al. |

OTHER PUBLICATIONS

Bochove, E.J. et al. "Theory of Spectral Beam Combining of Fiber Lasers," IEEE J. Quant. Elec., 38:5 (2002).
Burr, Geoffrey et al. "Angle and Space Multiplexed Holographic Storage Using the 90 degree Geometry," Optics Comm. 117 (1995).
Curtis, Kevin et al. "Cross Talk for Angle- and Wavelength-Multiplexed Image Plane Holograms," Optics Letters. vol. 19 (21) (1994).
Daneu, V. et al. "Spectral Beam Combining of a Broad-Stripe Diode Laser Array in an External Cavity," Opt. :ett. 25:6 (2000).

Dos Santos, Paulo et al. "Interference-term Real-time Measurement for Self-stablized Two-wave Mixing in Photorefractive Crystals," Optics Letters, Nov. 1988, vol. 13, No. 11, pp. 1014-1016.

Ford, Joseph et al. "Wavelength Add-Drop Switching Using Tilting Micromirrors," Journal of Lightwave Technology, vol. 17, No. 5 (May 1999).

Frejlich, Jamie et al. "Analysis of an Active Stabliziation System for a Holographic Setup," Applied Optics, May 15, 1988, vol. 27, No. 10, pp. 1967-1976.

Goodman, Joseph W. "Introduction to Fourier Optics," 1968, pp. 198-224.

Havermeyer, Frank et al. "Volume Holographic Grating-Based Continuously Tunable Optical Filter," Opt. Eng. 43(9), Sep. 2004, pp. 2017-2021.

Heaney et al., "Sol-gel derived photosensitive germanosilicate glass monoliths," Opt. Lett., vol. 25(24), pp. 1765-1767 (Dec. 2000).

Hill, "Photosensitivity in optical fiber waveguides: Application to reflection filter fabrication," Appl. Opt. Lett. vol. 32(10), pp. 647-649 (1978).

Hill, "Simple Transient Holograms in Ruby," Appl. Opt., vol. 10(7), pp. 1695-1697 (1971).

In re Rose, 220 F.2d 459, 105 USPQ 237-241 (CCPA 1955).

Kogelnik, Herwig. "Coupled Wave Theory for Thick Hologram Gratings," The Bell System Tech. Journal, Nov. 1969, vol. 48, No. 9, pp. 2909-2947.

Levene, Michael et al. "Method for Controlling the Shift Invairance of Optical Correlators," Applied Optics, Jan. 10, 1999, vol. 38, No. 2, pp. 394-398.

Li, Lijun et al. "Experimental Studies on Narrow-Linewidth YB3+- Doped Double-Clad Fiber-Laser Cavities Based on Double-Clad Fiber Bragg Gratings," Microwave and Optical Technology Letters, 44(1):53-56 (2005).

Littman, Michael G. "Singlemode Operation Grazing-Incidence Pulsed Dye Laser," Optics Letters, Oct. 1978, vol. 3, pp. 138-140.

Mill, P. "Single Mode Operation of a 1.55 Micrometer Semi-conductor Lasers Using a Volume Holographic Grating," Jul. 1985, Electronics Letters.

Mitchard, Gordon et al. "Double-Clad Fibers Enable Lasers to Handle High Power," Laser Focus World. Jan. 1999.

Miyazaki, T. et al. "Nd-Doped Double-Clad Fiber Amplifier at 1.06um," Journal of Lightwave Technology, 16(4): 562-566 (Apr. 1998).

Moser, Christophe. "Folded Shift Multiplexing," Optics Letters, vol. 28 (11) (Jun. 2003).

Sadot, D. et al. "Tunable Optical Filters for Dense WDM Networks," IEEE Communications Magazine, 50-55 (1998).

Saleh, B. and M. Teich, "Fundamentals of Photonics," Wiley-Interscience, p. 151, 631-632 (1991).

Smith, Warren. "Modern Optical Engineering," 1990, pp. 43-47.

Steckman, Gregory J. et al. "Holographic Data Storage in Phenanthrenequinone Doped PMMA," SPIE Photonics West, San Jose, CA (Jan. 27, 1999).

Steckman, Gregory J. et al. "Holographic Multiplexing in Photorefractive Polymers," Optics Communications, Nov. 1, 2000, 185, pp. 13-17.

Steckman, Gregory J. et al. "Storage Density of Shift-Multiplexed Holographic Memory," Applied Optics, Jul. 10, 2001, vol. 40, No. 20, pp. 3387-3394.

Venus, George et al. "Semiconductor 1.7 W Volume Bragg Laser with Divergence Close to a Diffraction Limit," 26th Annual Conference on Lasers and Electro-Optics. CLEO/IQES and PhAST Technical Digest, Paper Code CFG4, Long Beach, CA, May 2006.

Volodin, B.L. et al. "Wavelength Stabilization and Spectrum Narrowing of High-Power Multimode Laser Diodes and Arrays by Use of Volume Bragg Gratings," Optics Letters, vol. 29, No. 16 (Aug. 15, 2004).

Yiou, Silvie et al. "Improvement of the Spatial Beam Quality of Laser Sources with an Intracavity Bragg Grating," Opt. Lett, 28 (4), 242 (2003).

Zorabedian, Paul. "Tunable Lasers Handbook—tunable external-davity semi-conductor lasers," Chapter 8, Academic Press (1995).

Bosomworth et al. "Thick holograms in photochromic material" Applied Optics [Online] 1968, 7(1), Abstract.

Erdei et al. "Optimization method for the design of beam shaping systems" Optical Engineering [Online] 2002, 41, Abstract.

Shu et al. "More on analyzing the reflection of a laser beam by a deformed highly reflective volume Bragg grating using iteration of the beam propagation method" Applied Optics [Online] 2009, 48 (1), pp. 22-27.

METHOD AND APPARATUS USING VOLUME HOLOGRAPHIC WAVELENGTH BLOCKERS

CROSS-REFERENCE TO RELATED APPLICATION

The present patent application is a continuation and claims the priority benefit of U.S. patent application Ser. No. 12/315,470 filed Dec. 3, 2008, which claims the priority benefit of U.S. provisional patent application No. 61/137,871 filed on Aug. 4, 2008, the disclosures of which are incorporated by reference herein in their entirety.

BACKGROUND OF THE INVENTION

1. Field of the Invention

The present invention relates to a method and apparatus for fabricating and using volume holographic wavelength blockers of high optical density and narrow bandwidth. Wavelength blockers are used to attenuate the signal of a pump source, such as lasers, while letting a scattering signal such as, but not limited to, fluorescence or Raman to go through. Thick reflective volume holographic elements (>typ. 0.1 mm thickness) have narrow rejection band but have limited attenuation of the order of optical density of 1 to 2. It is desirable to have a narrow spectral band rejection in conjunction with high attenuation reaching at least an optical density 6 for Raman spectroscopy for example.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Wavelength blockers, also called notch rejection filters, are an essential component in Raman and fluorescence instruments. The purpose of the wavelength blocker is to greatly attenuate the backscattered light from the laser illuminating a sample under test, while letting the faint Raman spectrally shifted signature pass through. Two non-dispersive filter technologies are currently used for the wavelength blocker: holographic and thin film. Commercial holographic notch filter technology uses holographic recording in a thin film of dichromated gelatin to produce a notch filter with 3 dB bandwidth of 350 $cm^{-1}$ and optical density of 6. Commercial thin film technology uses deposition of many layers to obtain a 3 dB bandwidth of approximately 600 $cm^{-1}$ and optical density of 6. Both technologies provide a compact size wavelength blocker element with a 10 mm aperture diameter and several millimeters thickness. However, both notch filter technologies are limited to observing Raman spectral shift above approximately 350 $cm^{-1}$.

The Raman signal in the low frequency shift region, i.e., near the frequency of the excitation laser, contains critical information about the molecular structure. For example, carbon nanotubes exhibit vibration modes in the range of 150 $cm^{-1}$ to 200 $cm^{-1}$ depending on their size. Relaxation in liquids, solutions and biological samples exhibit Raman shift in the range between 0 and 400 $cm^{-1}$. U.S. Pat. Nos. 5,684,611 and 5,691,989 describe the use of reflective volume holographic filters (VHG) with millimeters thickness as filters producing 3 dB bandwidth of the order of 10 $cm^{-1}$. VHGs produced in a glass material are now commercially available and show long lifetime, high efficiency and excellent transmission in the red and near infrared. The photosensitive glass can contain, for example, silicon oxide, aluminum oxide and zinc oxide, fluorine, silver, chlorine, bromine and iodine, cerium oxide. Composition and processes for manufacturing the photosensitive glass are described in U.S. Pat. No. 4,057,408, the disclosure of which is incorporated herein by reference. Large area (30×30 mm) reflective VHGs are restricted to the millimeter range thickness due to the material absorption. The optical density (O.D) achievable is therefore limited to O.D near unity (i.e., ~90% efficiency) with thickness of 1.5 mm and transmission of 97 to 98% away from the notch in the near infrared.

By carefully individually aligning a cascade of VHGs, researchers have shown that the optical density can be added up: a cascade of 4 VHGs with each exhibiting an optical density of one yields a compounded notch with an optical density of 4. Commercial instruments comprising individual alignment fixtures for each VHG exhibit an optical density ranging from 4 to 6 with bandwidth of 10 $cm^{-1}$. However, there are several drawbacks to this approach:

1. The alignment procedure is complicated and required for each VHG separately.
2. The footprint is large (~100 $cm^3$) and as such not suitable to replace standard notch filters in existing Raman instruments.
3. The surface of each VHG contributes to Fresnel reflection loss.
4. Upon rotation of the assembly, the individual VHGs spectrally shift at different rates, thus reducing severely the optical density and broadening the overall blocker bandwidth.

The technology utilized to observe the Raman signal close to the laser excitation (>9 $cm^{-1}$) is based on cascading dispersive spectrometers. The cascaded spectrometers are bulky (~1 $m^2$), expensive (~$100K) and of moderate transmission (~50%).

SUMMARY OF THE INVENTION

The invention disclosed here teaches methods to fabricate and utilize a non-dispersive holographic wavelength blocker to overcome all the limitations outlined above. The invention enables the observation of the Raman signal near the excitation wavelength (~9 $cm^{-1}$) with the compactness of standard thin film/holographic notch filter. The novelty is contacting several individual volume holographic blocking notch filter (VHBF) to form one high optical density blocking filter without creating the spurious multiple diffractions that yield unacceptable rejection ratios. Such ultra-narrow-band VHBF can be used in existing compact Raman instruments and thus will help bring high-end research to a greater number of users at a lower cost.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

In the following description of the present invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The notch wavelength $\lambda_B$ of a reflective VHG is characterized by the grating period $\Lambda$ and the angle of incidence $\Theta$ of the collimated illumination on the grating planes:

$$\lambda_B = \lambda_o \cdot \cos(\Theta), \quad (1)$$

where $\lambda_o = 2 \cdot n \cdot \Lambda$ is the anti-parallel diffraction wavelength where n the index of refraction.

Identical reflection VHGs, i.e., VHGs characterized by the same grating period $\Lambda$ and incidence angle $\Theta$ cannot simply be stacked since the diffracted beams will fulfill the Bragg condition for other VHGs in the stack. Double diffraction on individual VHGs will cause interference effects and prevent the optical density values to be simply added.

Figure 1:
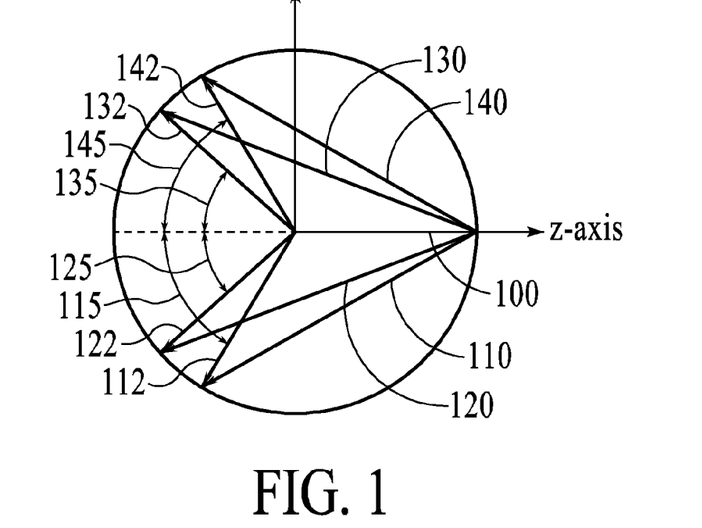
FIG. 1: Grating wave vector representation of four slanted reflective VHBF diffracting the same wavelength.

However, by varying the grating slant (the angle between the grating vector and the VHG surface normal) and the grating spacing, $\Lambda$ of each individual VHG in such a way that the same wavelength fulfills the Bragg condition for each VHG, the diffracted light from subsequent VHGs does not full fill the Bragg condition on any other grating. FIG. 1 illustrates an embodiment of the construction for a stack of four VHGs. The incident light beam 100 is represented in grating vector space. The grating vectors 110, 120, 130 and 140 each have a specific direction and amplitude and are represented in one plane for simplicity of the explanation. The diffracted beams 112, 122, 132 and 142, corresponding respectively to the four slanted VHGs, diffract the same wavelength but propagate in different directions given respectively by the angles 115, 125, 135 and 145 and thus the diffracted beams do not interfere or re-diffract with the other gratings.

Figure 2A:
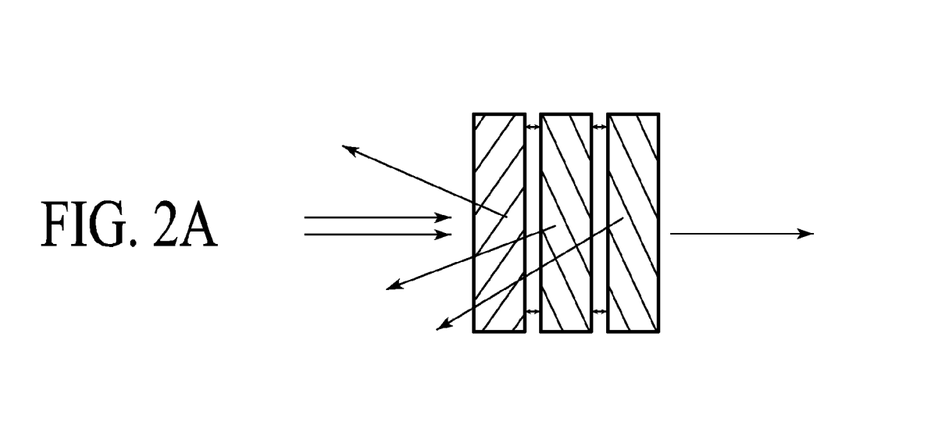
FIG. 2A, 2B: Illustration of stacked reflective VHBF assembly.
Figure 2B:
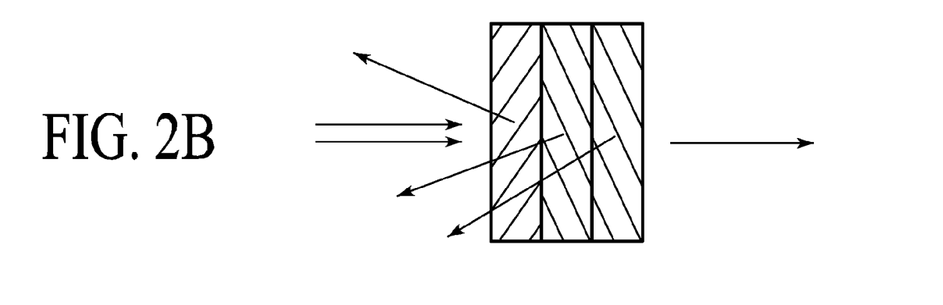

In one embodiment, each VHG may be physically separated, for example, but not limited to spacers as FIG. 2A illustrates. In another embodiment, each VHG may be physically contacted for example, but limited to, with an index matching epoxy as FIG. 2B illustrates. The invention is not limited to stacking three VHGs but rather the drawing in FIGS. 2A and 2B uses three VHBFs for simplicity. The number of VHGs comprising a VHBF is limited by the total transmission achievable.

Figure 3:
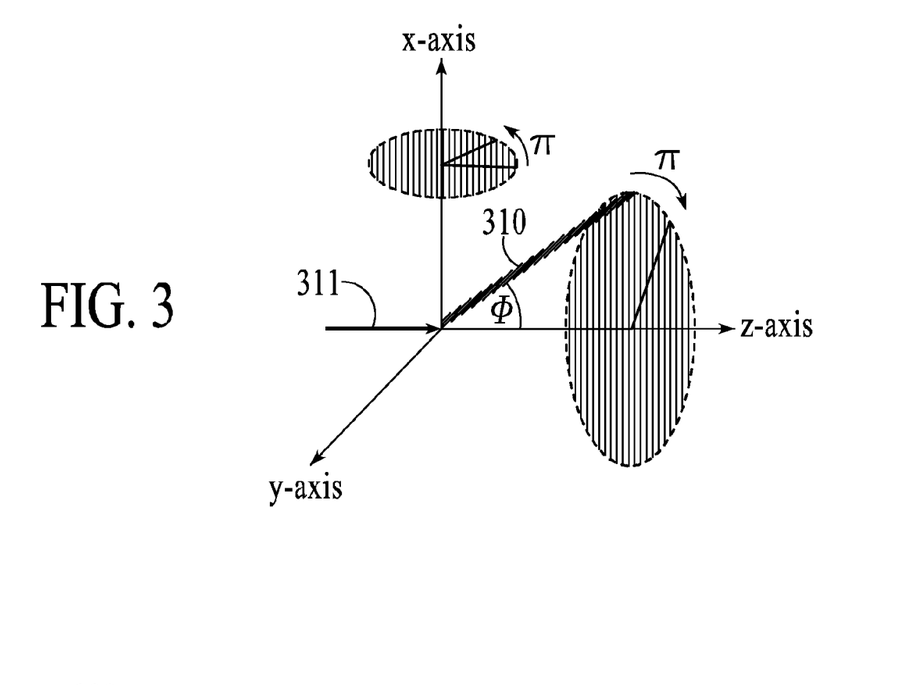
FIG. 3: Illustration for tuning the Bragg wavelength of each VHG in the VHBF assembly.

For the following analysis, we will assume that the collimated incident beam wave vector outside the material is parallel to the z-axis as FIG. 3 illustrates. The incident collimated beam 311 propagates in the direction of the z-axis: $\vec{K}_{air} = k_{air} \vec{e}_z$. We will allow a grating slant $\phi$ (angle between grating vector and surface normal) only in the x-z plane. We assume that the illumination is of single frequency. The laser wavelength is chosen slightly below the normal incidence wavelength of each VHG in the stack.

Following the illustration in FIG. 3, the first VHG is positioned with its grating vector $\vec{K}$ (310) in the x-z plane and rotated around the x-axis to fulfill the Bragg condition according to equation (1). The facet normal of the first VHG defines the incidence angle $\Theta_M$ of the entire stack with respect to the collimated illumination direction $\vec{k}_{air}$. The orientation of the facet normal of subsequent VHGs with respect to the incident beam, i.e., $\Theta_M$ are collinear with each other since we assume the VHG in the stack are in mechanical contact.

For the subsequent VHGs after the first one, fine wavelength tuning is achieved by rotating the VHG around its surface normal, the only degree of freedom left, by an angle $\omega$.

Using Snell's law, the incident beam wave vector in the material is:

$$\vec{k} = k \begin{pmatrix} 0 \\ -\sin(\Theta_x - \Theta_M) \\ \cos(\Theta_x - \Theta_M) \end{pmatrix} \text{ with } \Theta_M = a\sin(\sin(\Theta_x)/n), \quad (2)$$

where $\Theta_x - \Theta_M$ is the angle between z-axis and $\vec{k}$ and $\Theta_M$ the angle between surface normal and $\vec{k}$ measured inside the medium. After rotation of the VHG around the x-axis by an angle $\Theta_x$, and around the surface normal by angle $\omega$, the VHG's grating vector $\vec{K}$ is:

$$\vec{K} = K \begin{pmatrix} \cos(\omega)\sin(\phi) \\ \cos(\Theta_x)\sin(\omega)\sin(\phi) - \sin(\Theta_x)\cos(\phi) \\ \sin(\Theta_x)\sin(\omega)\sin(\phi) + \cos(\Theta_x)\cos(\phi) \end{pmatrix}. \quad (3)$$

Using $\cos(\Theta) = \vec{k} \cdot \vec{K}/(kK)$ and equation (3), we find the notch wavelength $\lambda_B$ as a function of the angles $\omega$ and $\Theta_M$:

$$\lambda_B = \lambda_0 \cos(\phi)(\cos(\Theta_M) + \sin(\Theta_M)\sin(\omega)\tan(\phi)). \quad (4)$$

From equation (4), we observe that individual VHGs can be Bragg-matched to the required notch wavelength by adjusting the rotation angles $\omega_i$ for each grating $i=2, \ldots, N$. The fine wavelength tuning is only possible when $\Theta_M, \phi_i > 0$.

Figure 4:
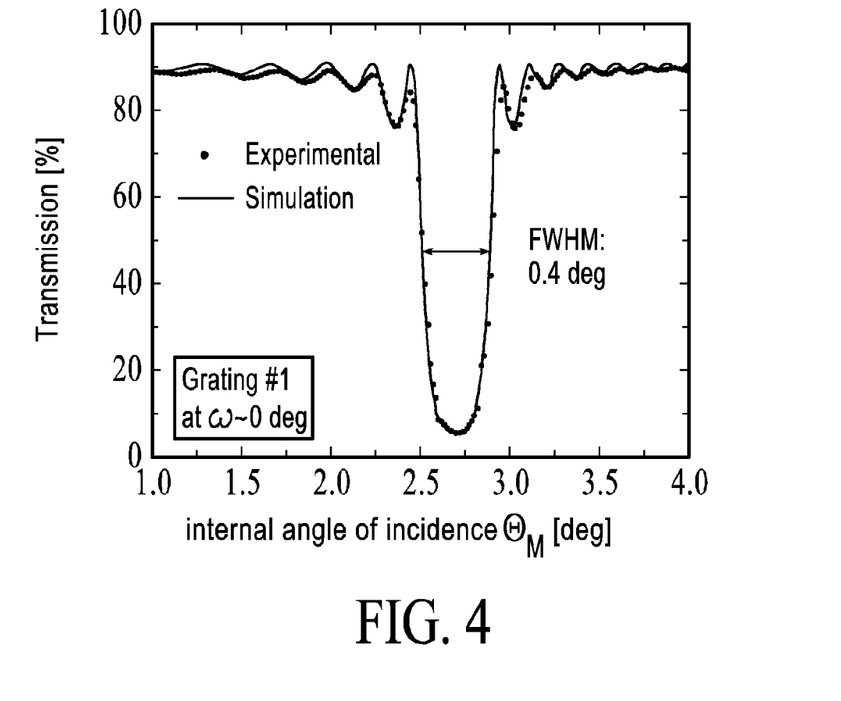
FIG. 4: Plot of a typical angular selectivity of one VHG in the VHBF stack.

A typical angular selectivity curve for an individual VHG is given in FIG. 4. The angular 3 dB bandwidth is 0.4 degrees. In another embodiment, the slant angle of each VHG is chosen such that the diffracted beams do not satisfy the Bragg condition for all other VHGs. From the measurement shown in FIG. 4, a value of at least 1 degree for the slant angle has been selected to satisfy that condition.

Figure 5A:
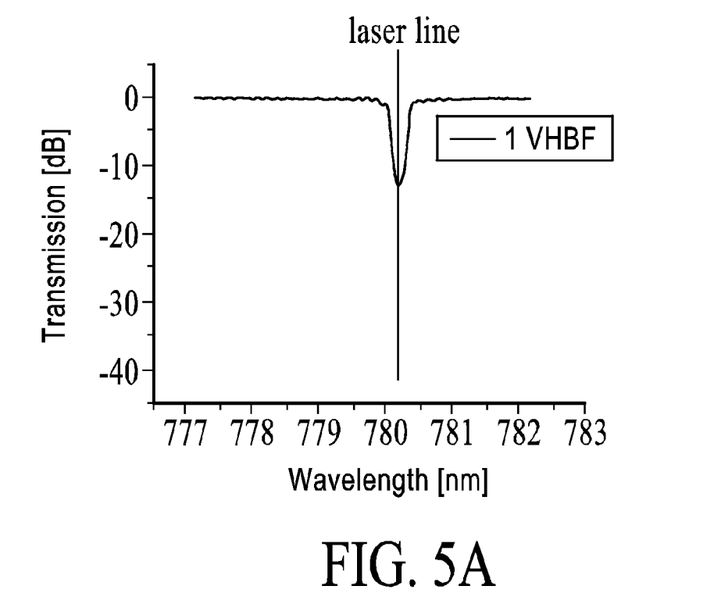
FIG. 5A, 5B: Spectral response of a VHBF assembly showing addition of optical densities.
Figure 5B:
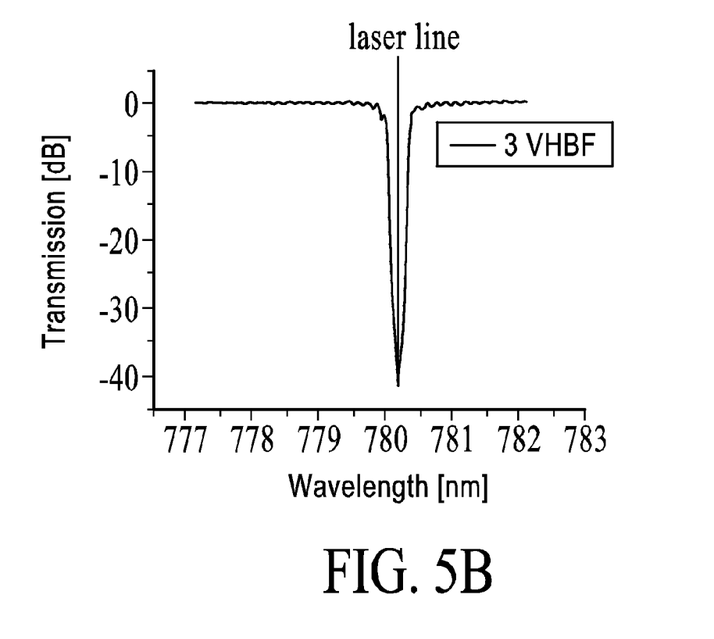

The rejection ratio of the VHBF assembly is the compounded rejection of each VHG in the stack when the alignment procedure outlined in the embodiments above is followed. This is justified because there are no coherent effects between the diffracted beams with the arrangement of the grating wave vector of each VHG described above. An example of spectral response of the notch filter with the VHBF assembly of one and three individual VHBF is shown respectively in FIGS. 5A and 5B.

We prepared six individual reflection VHGs with thickness of 1.6 mm and diffraction efficiencies near 90% (corresponding to optical density near unity). Anti-parallel diffraction wavelength and slant angles are given in table 1.

In one embodiment, each of the successive five VHGs is brought into direct mechanical contact to the previous VHG. After alignment, individual gratings are secured to the stack by an index matching epoxy. This procedure ensures that the internal incident angle $\Theta_M$ is the same for every grating in the stack. Only the rotation angle $\omega_i$ is used to fine tune the Bragg wavelength.

The laser used for the alignment is a wavelength locked semi-conductor laser diode at 785.0 nm, which is subsequently ASE filtered by a slanted reflection VHG. Grating #1 is aligned for Bragg diffraction with $\omega_1 \approx 0$ and $\Theta_M = 2.7$ deg.

TABLE 1

Measured anti-parallel diffraction wavelength $\lambda_{o,i}$, slant angle $\phi_i$ and peak diffraction efficiency $\eta$ for 6 gratings. Also given is the normal incidence wavelength $\lambda_{o,i} \cos(\phi_i)$, which determines the tuning range of the final stack. The average normal incidence wavelength $\lambda_{o,i} \cos(\phi_i)$ is $(785.84 \pm 0.069)$ nm.

| VHG # | $\lambda_{o,i}$ [nm] | $\phi_i$ [deg] | $\lambda_{o,i} \cos(\phi_i)$ [nm] | $\eta$ [%] |
|---|---|---|---|---|
| 1 | 785.96 | +0.94 | 785.85 | 93 |
| 2 | 786.04 | −1.02 | 785.92 | 92 |
| 3 | 786.10 | +1.50 | 785.83 | 95 |
| 4 | 786.18 | −1.50 | 785.91 | 91 |
| 5 | 786.32 | +2.02 | 785.83 | 92 |
| 6 | 786.20 | −1.99 | 785.73 | 91 |

Now, let's determine what happens when the stack of bonded VHGs is wavelength tuned.

In another embodiment, wavelength tuning is performed by varying the incident angle from the initial alignment angle $\Theta_M$ to a new incident angle $\Theta_M + \Delta\Theta_M$. For all VHGs in the stack, the new notch wavelength will vary according to equation (4) and the difference in wavelength between any two gratings can be computed to be:

$$\Delta\lambda = (\lambda_{o,1}\cos(\phi_1) - \lambda_{o,2}\cos(\phi_2))\frac{\sin(\Delta\Theta_M)}{\sin(\Theta_M)}. \quad (5)$$

Note that the wavelength shift between any two gratings does not depend on the rotation terms $\omega_i$. This is due to the constraint that at the alignment angle $\Theta_M$ of the stack, the wavelength shift $\Delta\lambda$ is equal to zero.

Table 1 gives a standard deviation of 0.069 nm for the quantity $(\lambda_{o,i} \cos(\phi_i) - \lambda_{o,j} \cos(\phi_j))$.

Figure 6A:
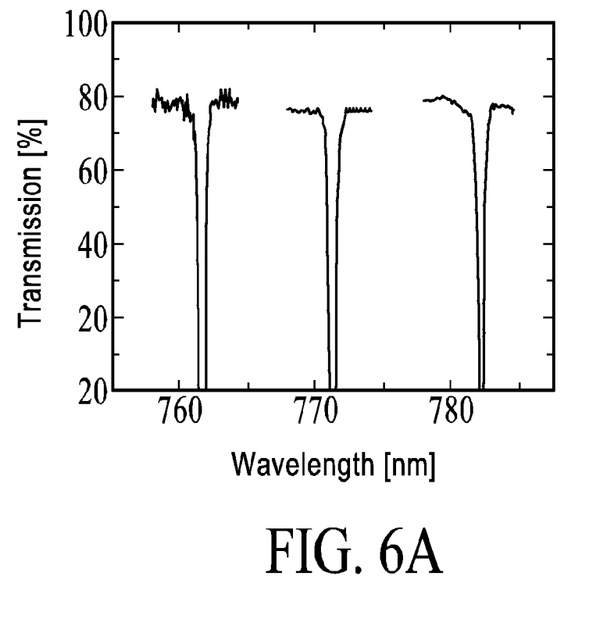
FIG. 6A, 6B: Plot showing wavelength tuning of the VHBF assembly and spectral transmission between 700 and 1000 nm.

The stack of six VHGs was aligned at a value for $\Theta_M$ of 2.7 degrees and tuned by $\Delta\Theta_M$ of 11.4 degrees (these are values inside the material of index n=1.5). According to equation 5, we expect to observe a broadening of the overall bandwidth by 0.29 nm. The experimental result is shown in FIG. 6A. As expected, the 6-stack wavelength blocker maintains a single transmission notch at all tuning angles. The measured spectral bandwidth broadening is half the computed value (0.14 nm vs. 0.29 nm).

Figure 6B:
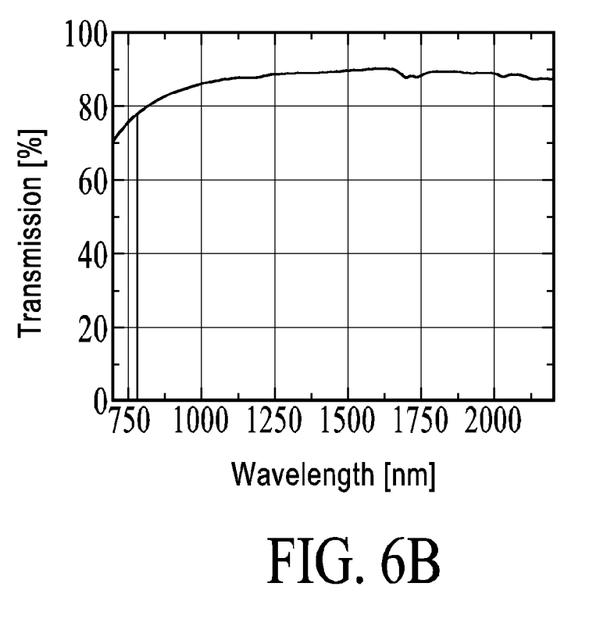

Light transmission of the six-stack wavelength blocker is measured by a CARY 500 spectrometer. The transmission measurement in FIG. 6B shows that the 9.6 mm thick filter stack (6 times 1.6 mm) transmits greater than 80% of the incident light outside the notch. The first and last VHG facets are without anti-reflection (AR) coatings. An additional 8% transmission could be gained by adding an AR coating to the outside facet of the first and last VHG in the stack.

Figure 7A:
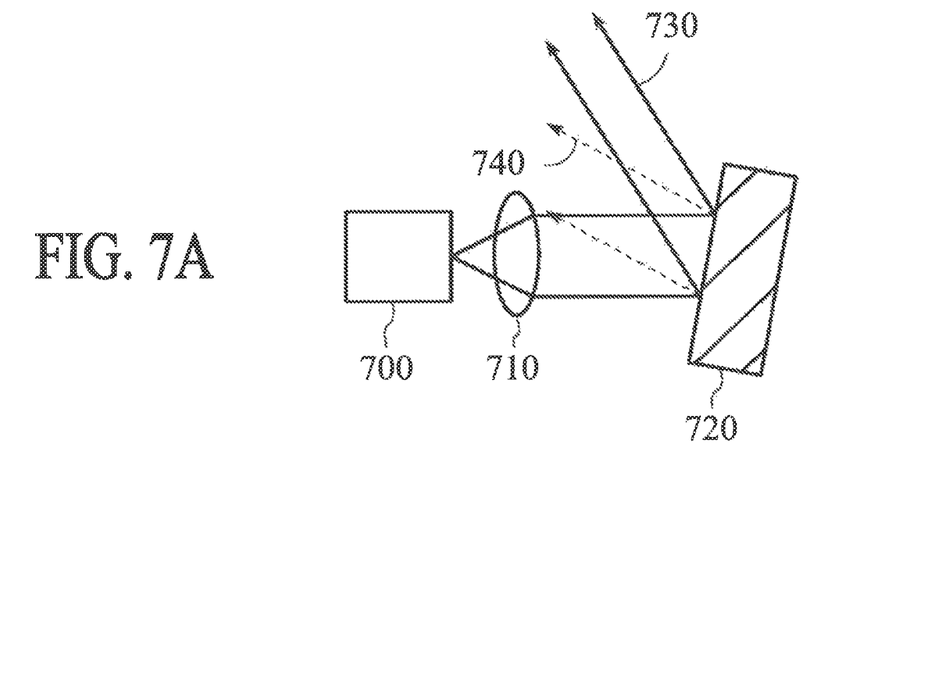
FIG. 7A, 7B: Illustration of an ASE filtered laser source and a plot of an ASE suppressed laser diode spectrum.

In another embodiment, the Raman excitation laser light source is a laser whose amplified spontaneous emission is filtered as illustrated in FIG. 7A. A laser light source 700 is collimated by collimating assembly 710. A slanted reflective VHG 720 is positioned to receive the collimated beam. The diffracted beam 730 is the ASE filtered beam. The specularly reflected light beam 740 is propagating in a different direction. In other embodiments, more than one ASE filter can be used to further reduce the ASE content of the laser.

Figure 7B:
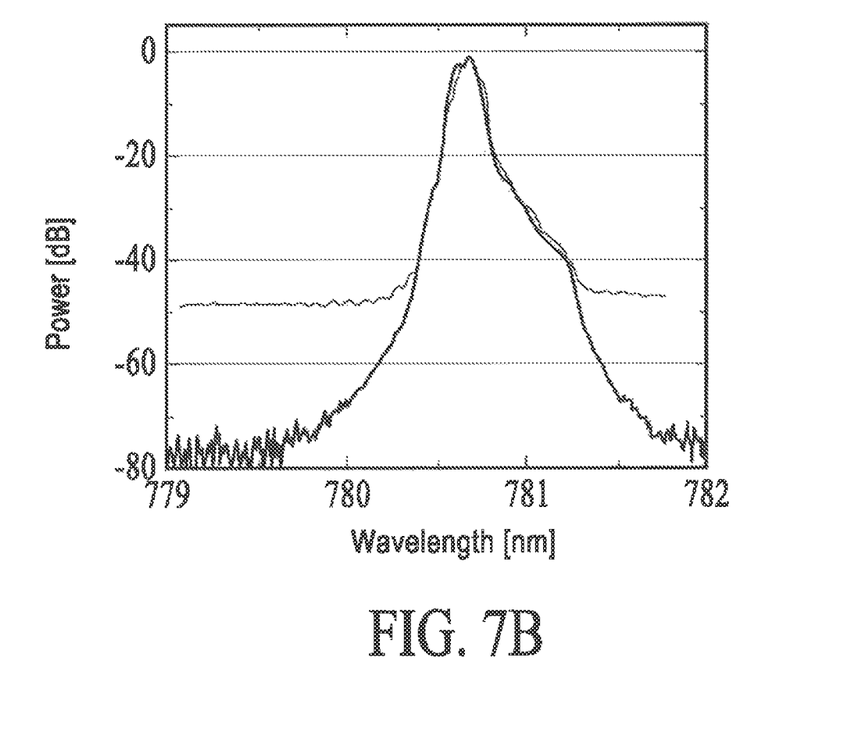

FIG. 7B shows the spectrum of the unfiltered and filtered laser diode measured with an ANDO double spectrometer with 0.05 nm resolution. We observe that the ASE of the original laser diode is drastically reduced. The spectrometer distorts and broadens the actual ASE filtered spectrum due to stray light inside the spectrometer. The optical density of the fabricated stack is measured at 780.7 nm with an ASE filtered single frequency laser light source.

Figure 8:
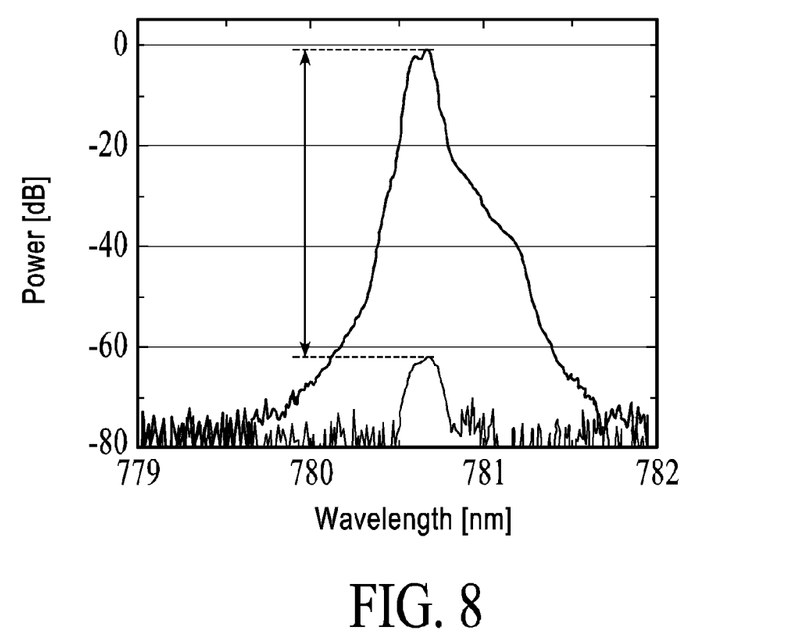
FIG. 8: Plot showing the optical density of 6 achieved with a VHBF assembly of 6 VHGs.

The collimated light beam of dimension 1 mm×2 mm is incident on the wavelength blocker. The transmitted light is fiber coupled to a multimode fiber and sent to the spectrometer. The result is shown in FIG. 8. An attenuation of the laser power of 60 dB, corresponding to an optical density of 6, is achieved. The stack was assembled at a wavelength of 785.1 nm. We have shown that after tuning the stack by 5 nm, an optical density of 6 was maintained.

Figure 9:
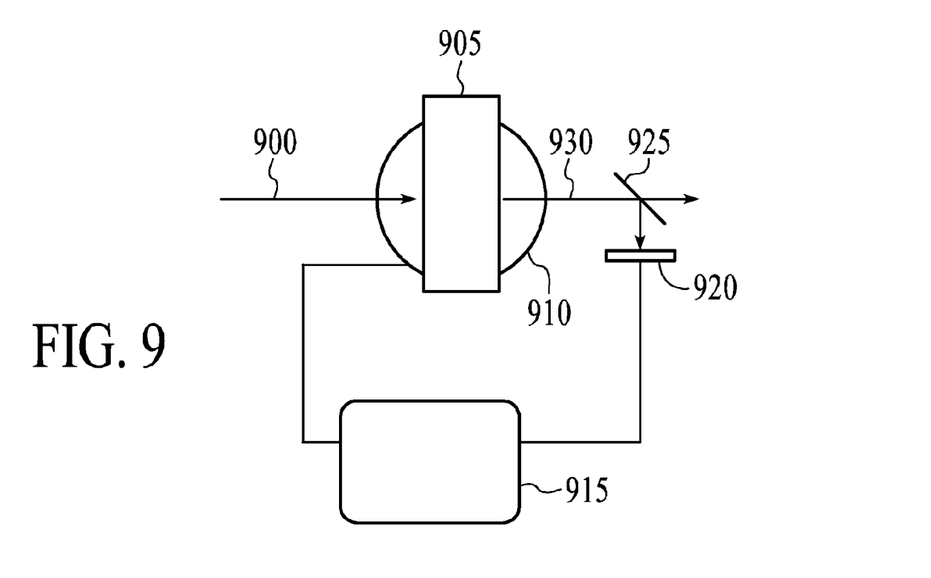
FIG. 9: Illustration of a feedback loop for the keep the VHBF assembly aligned to the laser frequency for maintaining maximum optical density.

Another embodiment in the invention is a means to angularly tune the VHBF assembly so that the Bragg wavelength of the VHBF always tracks the wavelength of the excitation laser in order to obtain maximum optical density (maximum rejection of the excitation light). An example of a tuning mechanism consists of positioning the VHBF on a rotation stage and rotating the stage. A detector is added to receive a portion of the attenuated pump after the VHBF assembly. The signal can be used as feedback to the tuning mechanism. FIG. 9 illustrates the tuning and feedback mechanism. The VHBF 905 is placed on the rotation stage 910. The collimated signal 900 is incident on the VHBF 905. A fraction of the transmitted beam 930 is deflected by the beam-splitter 925 and directed to a photodetector 920. The electrical signal is processed by a computer or microprocessor 915 and a feedback signal is sent to the rotation stage to minimize to photodetected power.

Figure 10:
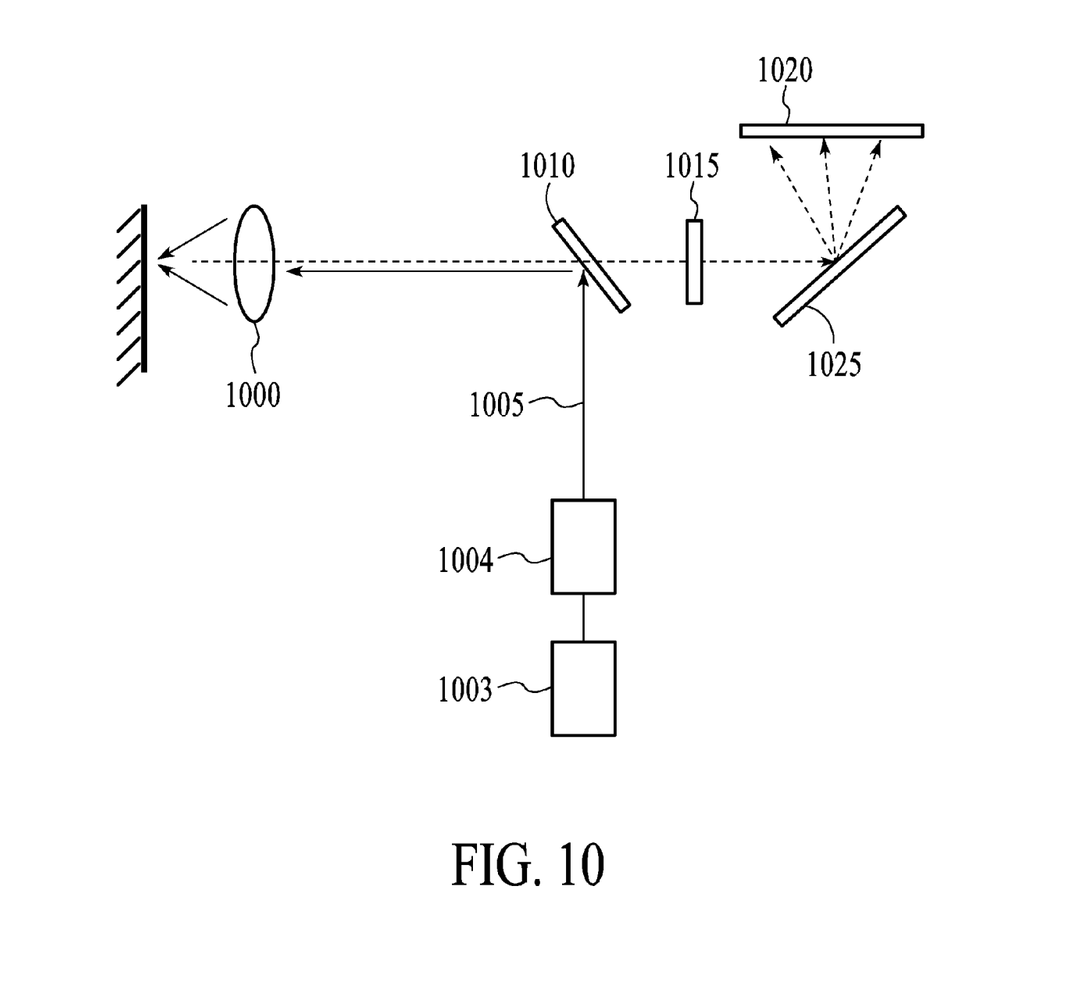
FIG. 10: Illustration of a Raman apparatus using a VHBF assembly and an ASE suppressed laser excitation source.

Another embodiment is an apparatus that uses the VHBF assembly of the embodiments above as illustrated by FIG. 10. A laser source 1003 is collimated and ASE filtered by the assembly 1004. The ASE filtered beam 1005 is reflected by a dichroic beam-splitter 1010 towards a lens assembly 1000 that focuses the laser beam onto a sample under examination. The dichroic beam-splitter 1010 reflects the laser beam and is transparent to other wavelength. In yet another embodiment, the dichroic beam-splitter 1010 may be a reflective or transmissive VHG or any other type of narrowband filter. The signal beam generated from the sample as a result of the excitation laser beam (fluorescence, Raman) as well as the backscattering of the laser is recollimated by the same lens assembly 1000. The signal is transmitted through the dichroic beam-splitter 1010 and incident on the VHBF assembly 1015 that may also include the tuning assembly disclosed in the embodiment above. Further spatial beam filters may be incorporated in the path of the signal beam to perform a confocal system. After the VHBF assembly, the laser light is rejected and the Raman, fluorescence or any other signal generated by the excitation laser impinges on a dispersive element 1025 such as, but not limited to, a diffraction grating. The spectrally dispersed signal is then received by an array of photodetector 1020. The array of photodetectors can be one or two dimensional.

Figure 11:
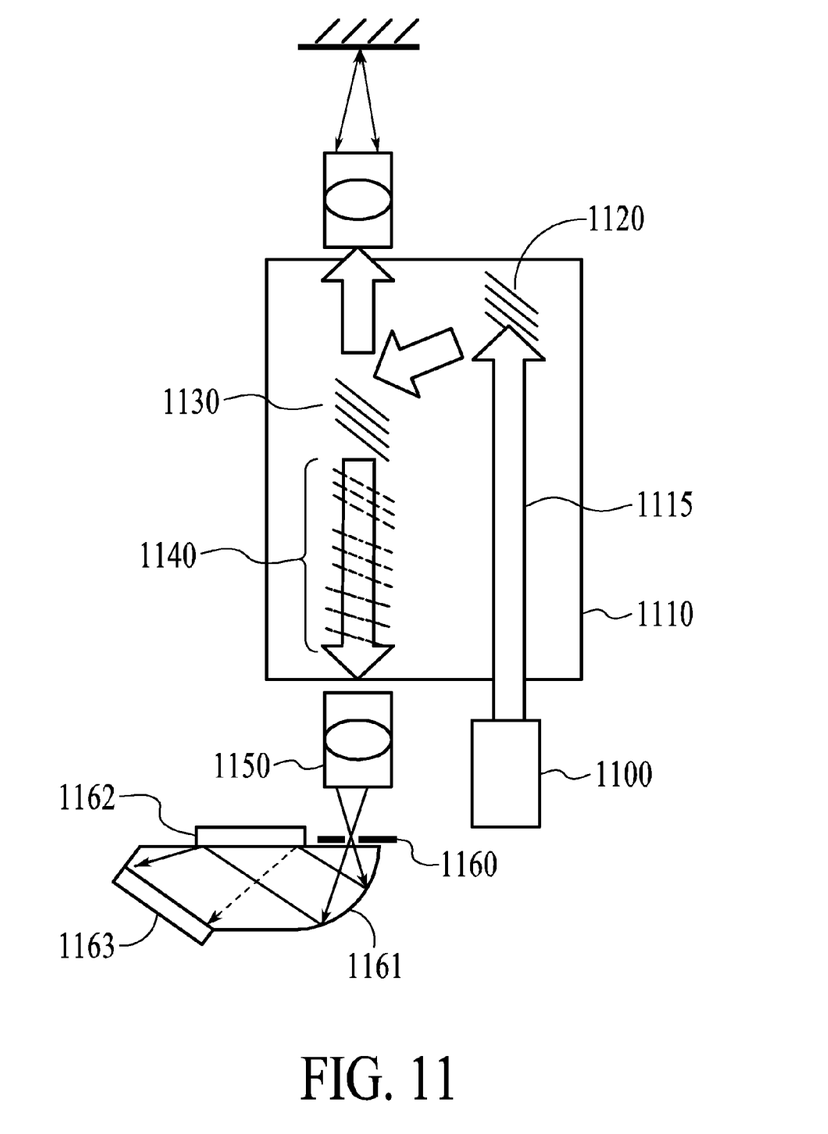
FIG. 11: Illustration of a Raman spectrometer incorporating the ASE function, the blocker function, the dichroic filter function in one glass holographic wafer.

In another embodiment, many of the discrete functions that comprise a standard Raman or fluorescence system, such as laser, ASE filtering, dichroic beam-splitters and wavelength blocker are integrated in a single holographic glass wafer. FIG. 11 illustrates the embodiment. A laser diode 1100 is collimated to produce collimated beam 1115 which is directed to the entrance facet of a holographic glass wafer 1110. A grating 1120, recorded holographically using a transmission geometry, filters the collimated beam 1115 and directs it to an identical grating 1130, also recorded holographically using a transmission geometry. The role of the grating 1130 is of an ASE filter and dichroic beam-splitter. The ASE filtered beam is then brought to a focus by a lens assembly 1150. The wavelength blocker is a cascade of VHGs 1140 whose grating vector amplitude and direction are designed to diffract the same wavelength. The VHGs 1140 are recorded holographically with the transmission geometry. The wavelength blocker attenuates the backscattered laser excitation light. The dimension of the holographic wafer is approximately 10 mm by 15 mm and comprises three distinct functions: ASE filtering, dichroic beam-splitter and wavelength blocker.

After the wavelength blocker, a lens assembly 1150 is used in conjunction with an aperture 1160 to perform confocal measurements. The lens assembly 1150 can be, but is not limited to, a cylindrical lens. A compact spectrometer is built in one glass block, which has a cylindrical surface 1161 to collimated the signal to direct it to a dispersive grating 1162. The spectrally dispersed signal is then capture by an array of photodetectors 1163.

Figure 12:
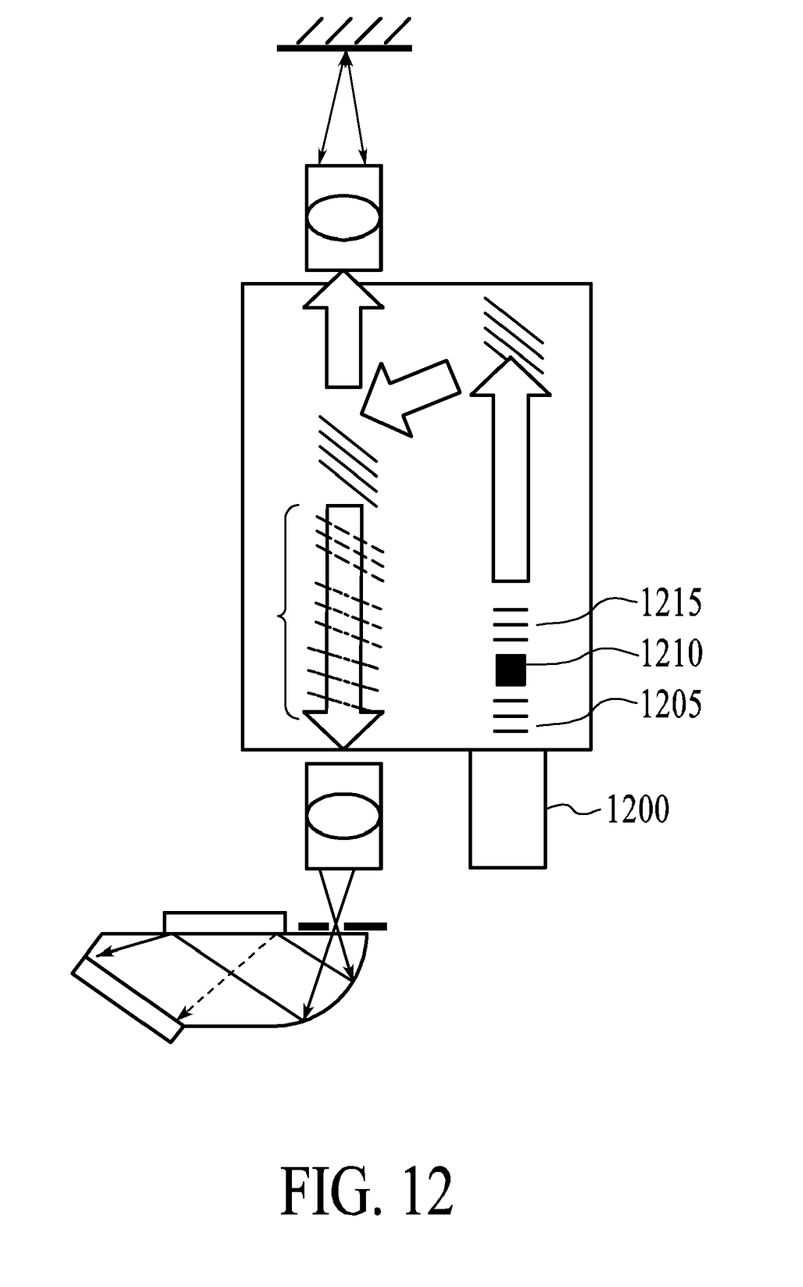
FIG. 12: Same as FIG. 11, except that the laser is incorporated in the doped holographic wafer.

In another embodiment illustrated in FIG. 12, the laser 1200 is used to pump a doped glass region 1210 (for example, but not limited to, Neodymium) which is surrounded by two holographically written reflective VHGs 1205 and 1215 that serve as resonators to amplify the doped glass region and provide laser light.

What is claimed is:

1. A volume holographic wavelength blocking filter assembly comprising:
   a plurality of reflective volume holographic gratings having a cumulative optical density of at least two, each reflective volume holographic grating having
   a distinct slant angle; and
   a distinct grating spacing,
   wherein the plurality of reflective volume holographic gratings produce a filtered optical signal when disposed in a path of an optical signal.

2. The volume holographic wavelength blocking filter assembly of claim 1, wherein the optical signal is a Raman signal.

3. The volume holographic wavelength blocking filter assembly of claim 1, wherein the plurality of reflective volume holographic gratings have a cumulative optical density of at least four at the Bragg wavelength.

4. The volume holographic wavelength blocking filter assembly of claim 1, wherein at least two of the reflective volume holographic gratings are bonded with an index matching epoxy.

5. The volume holographic wavelength blocking filter assembly of claim 1, wherein at least two of the reflective volume holographic gratings are secured to each other at their edges and have an index matching fluid between the gratings.

6. The volume holographic wavelength blocking filter assembly of claim 1, wherein at least two of the reflective volume holographic gratings are secured to each other via optical contacting.

7. The volume holographic wavelength blocking filter assembly of claim 1, wherein at least two of the reflective volume holographic gratings have index matched optical coatings and are secured to each other at their edges.

8. The volume holographic wavelength blocking filter assembly of claim 1, wherein at least two of the reflective volume holographic gratings are separated by spacers and are secured to each other at their edges.

9. The volume holographic wavelength blocking filter assembly of claim 1, wherein at least two of the reflective volume holographic gratings are coated with an anti-reflection material.

10. The volume holographic wavelength blocking filter assembly of claim 1, wherein the product of the cosine of the slant angle and the grating spacing for each reflective volume holographic grating forming the stack is substantially equal to each of the other products.

11. The volume holographic wavelength blocking filter assembly of claim 1, wherein each reflective volume holographic grating is successively aligned by a first rotation of a common angle with respect to a collimated single frequency laser beam and a second rotation around the surface normal of each reflective volume holographic grating by an angle to maximize the optical density at the common Bragg wavelength.

12. The volume holographic wavelength blocking filter assembly of claim 1, wherein the slant angle and the grating spacing is measured for each volume holographic grating, each volume holographic gratings being passively aligned.

13. The volume holographic wavelength blocking filter assembly of claim 1, wherein the blocking wavelength is tuned by rotation.

14. The volume holographic wavelength blocking filter assembly of claim 1, wherein the blocking wavelength is at least partially tuned by temperature.

15. The volume holographic wavelength blocking filter assembly of claim 1, wherein the holographic material is made of photosensitive glass.

16. The volume holographic wavelength blocking filter assembly of claim 15, wherein the photosensitive glass comprises at least one compound selected from the group consisting of silicon oxide, aluminum oxide, and zinc oxide.

17. The volume holographic wavelength blocking filter assembly of claim 16, wherein the photosensitive glass further comprises an alkali oxide, fluorine, silver and at least one compound selected from the group consisting of chlorine, bromine, and iodine.

18. The volume holographic wavelength blocking filter assembly of claim 16, wherein the photosensitive glass further comprises cerium oxide.

19. The volume holographic wavelength blocking filter assembly of claim 1, wherein the entire filter assembly forms a compact device that is used in a handheld device that is easily transportable.

20. The volume holographic wavelength blocking filter assembly of claim 1, wherein the entire filter assembly is formed on a single photosensitive glass wafer to form a compact device that is used in a handheld device that is easily transportable.

21. An apparatus for Raman spectroscopy, the apparatus comprising:
   a laser, an output of the laser being directed toward physical matter to cause Raman scattering, thereby producing a Raman signal;
   a plurality of reflective volume holographic gratings having a cumulative optical density of at least two, each reflective volume holographic grating having a distinct slant angle; and
a distinct grating spacing,
wherein the plurality of reflective volume holographic gratings produces a filtered Raman signal when disposed in a path of a Raman signal;
the apparatus further comprising an optical spectrometer disposed in a path of the Raman signal to measure a spectrum of the Raman signal and to generate a detection signal; and
a microprocessor to receive the detection signal to determine properties of the physical matter.

22. The apparatus of claim 21, further comprising:
a beam-splitter positioned in the path of the filtered Raman signal to sample a portion of the beam; and
a photodetector, wherein the sampled portion of the beam is detected by the photodetector to generate a signal to create a feedback mechanism to tune the laser wavelength to maximize the optical density at the Rayleigh wavelength.

23. The apparatus of claim 21, further comprising a filter assembly positioned in the path of the laser that removes at least amplified spontaneous emission from the laser output.

24. The apparatus of claim 23, wherein the filter assembly comprises one or more volume holographic gratings.

25. The apparatus of claim 21, wherein the blocking wavelength is tuned by rotation.

26. The apparatus of claim 21, wherein the blocking wavelength is at least partially tuned by temperature.

27. The apparatus of claim 21, further comprising a fiber optic cable to deliver the signal to the spectrometer.

28. The apparatus of claim 21, wherein the entire filter assembly is formed on a single photosensitive glass wafer to form a compact device that is handheld and easily transportable.

29. The apparatus of claim 28, wherein the laser is also mounted on the single photosensitive glass wafer.

30. The apparatus of claim 21, wherein a volume holographic grating is used as a dichroic beam-splitter to reflecting the main laser line and transmit other spectral components.

31. The apparatus of claim 21, wherein a volume holographic grating is used to:
direct more than 50% of the laser light toward the sample;
divert ASE light or parasitic longitudinal modes away from the sample;
divert more that 50% of the Rayleigh scattered light away from the detection system; and
transmit the Raman scattered light toward the detection system.

* * * * *